(12) United States Patent
Higo

(10) Patent No.: US 12,304,378 B2
(45) Date of Patent: May 20, 2025

(54) SECURING APPARATUS FOR FLATBED TRAILER

(71) Applicant: Hiromi Higo, Chilliwack (CA)

(72) Inventor: Hiromi Higo, Chilliwack (CA)

( * ) Notice: Subject to any disclaimer, the term of this patent is extended or adjusted under 35 U.S.C. 154(b) by 669 days.

(21) Appl. No.: 17/656,212

(22) Filed: Mar. 23, 2022

(65) Prior Publication Data

US 2023/0302985 A1 Sep. 28, 2023

(51) Int. Cl.
*B60P 7/08* (2006.01)
(52) U.S. Cl.
CPC ........... *B60P 7/0838* (2013.01); *B60P 7/0853* (2013.01)
(58) Field of Classification Search
CPC ......... B60P 7/0838; B60P 7/0853; B60P 7/15; F16G 11/12; B60C 25/05; B66F 1/00; B66F 3/00; B66F 5/00
USPC .......................... 410/130, 100, 23; 24/68 CD
See application file for complete search history.

(56) References Cited

U.S. PATENT DOCUMENTS

| | | | | |
|---|---|---|---|---|
| 3,357,670 A * | 12/1967 | Larson | ...................... | B60R 9/00 211/100 |
| 3,671,014 A * | 6/1972 | Karlsson | ............... | B60P 7/0823 24/68 CD |
| 4,247,235 A * | 1/1981 | Sunesson | .............. | B60P 7/0861 410/100 |
| 4,706,343 A * | 11/1987 | Neidigk | .................. | F16G 11/12 254/93 H |
| 2003/0031524 A1 * | 2/2003 | Brunet | ................. | B61D 45/001 410/100 |
| 2010/0266360 A1 * | 10/2010 | Welch | ................... | B60P 7/0838 410/96 |
| 2017/0073204 A1 * | 3/2017 | Lageson | ................ | F16M 11/28 |
| 2022/0250532 A1 * | 8/2022 | Nilsson | ................... | B60R 7/005 |

* cited by examiner

*Primary Examiner* — Amy R Weisberg
*Assistant Examiner* — Philip Charles Adams
(74) *Attorney, Agent, or Firm* — Orin Del Vecchio

(57) ABSTRACT

A securing apparatus configured to provide automated tensioning and loosening of a strap being utilized to secure an object to a flatbed trailer. The present invention includes a first plate member that is movably mounted proximate the bottom surface of the flatbed trailer. The first plate member includes an aperture proximate the first end thereof. A cylinder bracket member is present on the bottom surface of the first plate member and is surroundably present to the aperture. A cylinder is releasably secured to the cylinder bracket member and the piston thereof is configured to pass through the aperture and engage the bottom of the flatbed trailer. A hook member is formed on the first end of the first plate member and is configured to have an end of strap secured thereto. The first plate member is movable with respect to the trailer.

14 Claims, 2 Drawing Sheets

US 12,304,378 B2

SECURING APPARATUS FOR FLATBED TRAILER

FIELD OF THE INVENTION

The present invention relates generally to load securing for trailers, more specifically but not by way of limitation, a securing apparatus that is configured to provide tightening and loosening of cargo straps wherein the present invention is automated through utilization of a hydraulic cylinder so as to facilitate the securing of cargo on a flatbed trailer.

BACKGROUND

Millions of tractor-trailers are utilized on a daily basis to transport a variety of goods. Tractor-trailers employ various different types of trailers depending upon the type of products they are carrying. These trailers can include but are not limited to conventional box trailers, refrigerated trailers and flatbed trailers. The latter type is very commonly utilized for objects that are bulky in size and cannot be effectively loaded onto any other type of trailer. Flatbed trailers are utilized to carry items such as but not limited to heavy equipment, industrial supplies such as pipes and many other large and bulky items. Conventional flatbed trailers have winches and straps secured thereto wherein the straps and winches are utilized to secure the cargo for transport.

One problem with conventional winches and straps is the operation thereof and the limitations as a result of the individual securing the strap. The winches are typically operated utilizing a lever arm, which is most often just a metal bar carried by the individual that is generally about three feet in length. Once the end of the strap is secured on the opposing side of the trailer, the individual utilizes the lever arm to rotate the winch so as to tighten the strap securing the cargo. This can require a great deal of physical effort on the part of the individual and the individual may not be physically capable of tightening the strap to a force that is optimum to secure the cargo. Additionally, once under tension when the individual begins to loosen the winch they typically have to use one hand to engage the lever arm and use another hand to release a pin on the winch. This move requires a great deal of strength and poses a significant risk for the individual as there is a probability the strap and winch could release in an uncontrolled manner.

Accordingly, there is a need for a cargo securing apparatus that is configured to tighten and loosen cargo straps on a flatbed trailer wherein the apparatus deploys a hydraulic cylinder so as to provide automated control of manipulating the cargo straps on a flatbed trailer.

SUMMARY OF THE INVENTION

It is the object of the present invention to provide a securing apparatus for a flatbed trailer configured to provide control of cargo straps wherein the present invention includes a first plate member.

Another object of the present invention is to provide a cargo strap control apparatus operable to provide tightening and loosening of cargo straps on a flatbed trailer wherein the first plate member is secured adjacent to a bottom surface of a flatbed trailer having a void therebetween.

A further object of the present invention is to provide a securing apparatus for a flatbed trailer configured to provide control of cargo straps wherein the first plate member is movably coupled to the bottom surface of the flatbed trailer.

Still another object of the present invention is to provide a cargo strap control apparatus operable to provide tightening and loosening of cargo straps on a flatbed trailer wherein the first plate member further includes an aperture journaled therethrough.

An additional object of the present invention is to provide a securing apparatus for a flatbed trailer configured to provide control of cargo straps wherein the second plate member further includes a cylinder mounting bracket on the bottom surface of the first plate member proximate the aperture.

Yet a further object of the present invention is to provide a cargo strap control apparatus operable to provide tightening and loosening of cargo straps on a flatbed trailer wherein the first plate member further includes a hook member secured thereto proximate the first end of the second plate member.

Another object of the present invention is to a provide a securing apparatus for a flatbed trailer configured to provide control of cargo straps wherein the present invention further includes a hydraulic cylinder configured to be operably coupled to the first plate member.

An alternate object of the present invention is to provide a cargo strap control apparatus operable to provide tightening and loosening of cargo straps on a flatbed trailer wherein the present invention further includes bolt members operably coupled to the first plate member and bottom of the flatbed trailer wherein the bolt members are configured to maintain a position of the first plate member ensuing tightening of a strap secured to the hook.

To the accomplishment of the above and related objects the present invention may be embodied in the form illustrated in the accompanying drawings. Attention is called to the fact that the drawings are illustrative only. Variations are contemplated as being a part of the present invention, limited only by the scope of the claims.

BRIEF DESCRIPTION OF THE DRAWINGS

A more complete understanding of the present invention may be had by reference to the following Detailed Description and appended claims when taken in conjunction with the accompanying Drawings wherein:

DETAILED DESCRIPTION

Figure 1:
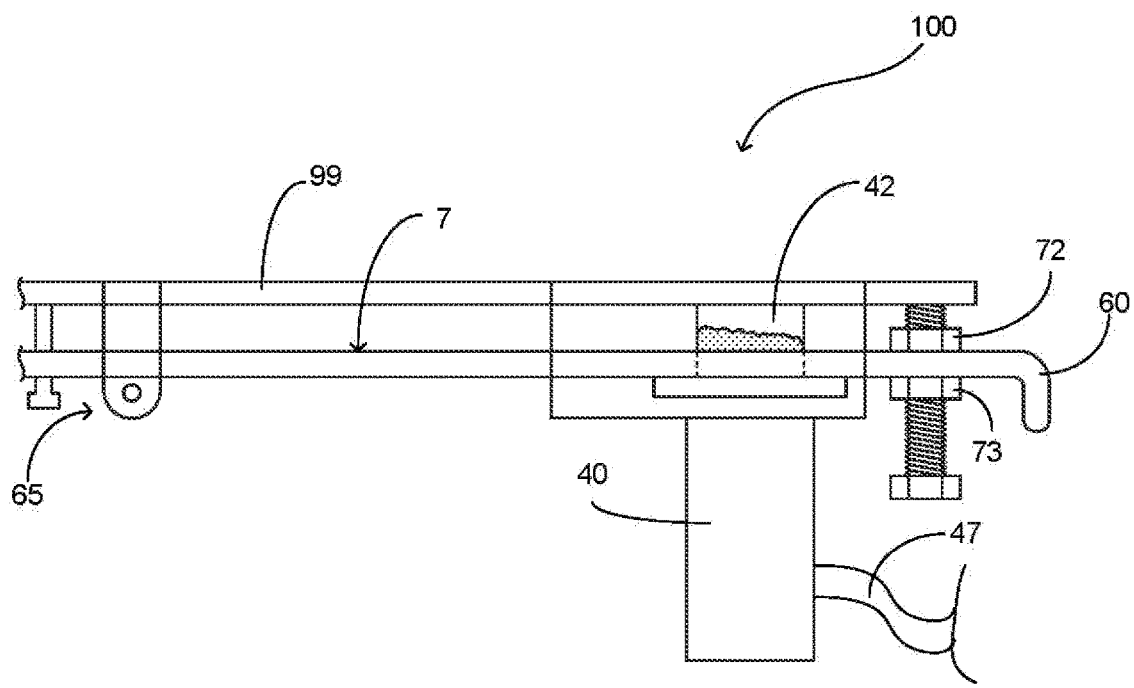
FIG. 1 is a side view of the present invention.
Figure 2:
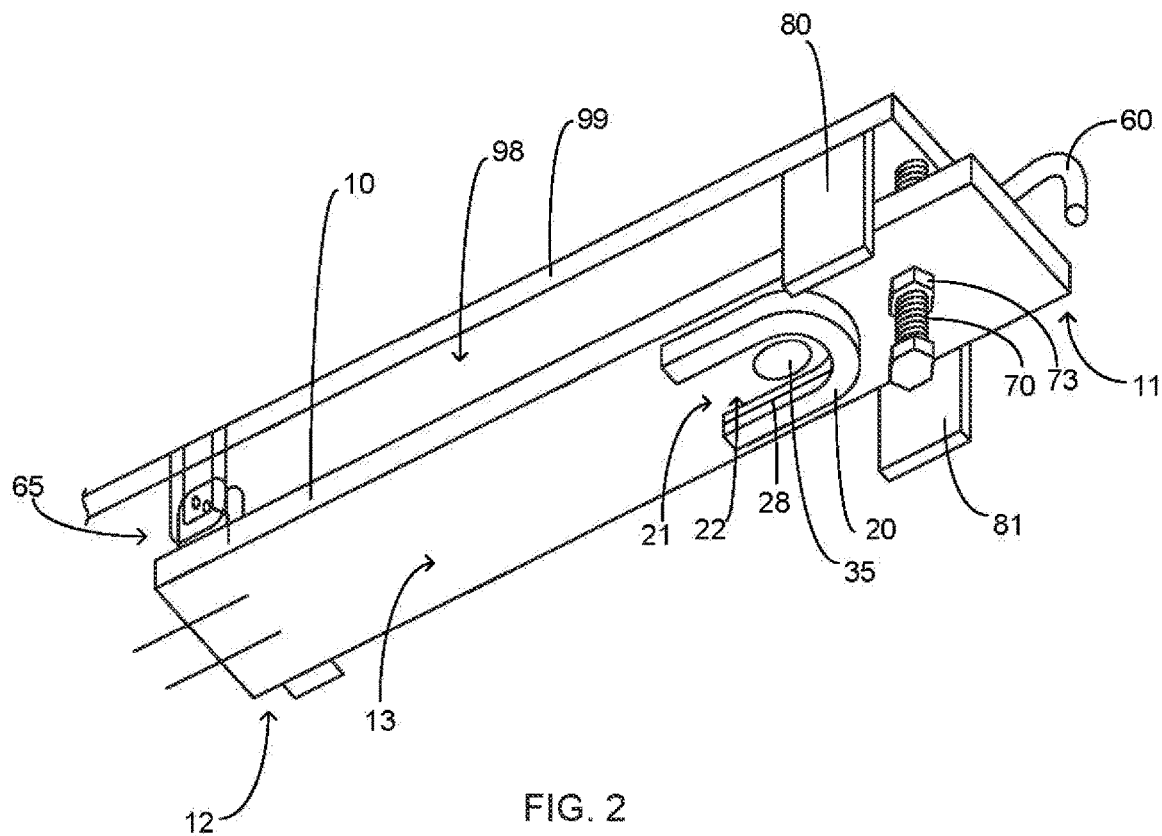
FIG. 2 is a bottom perspective view of the present invention.
Figure 3:
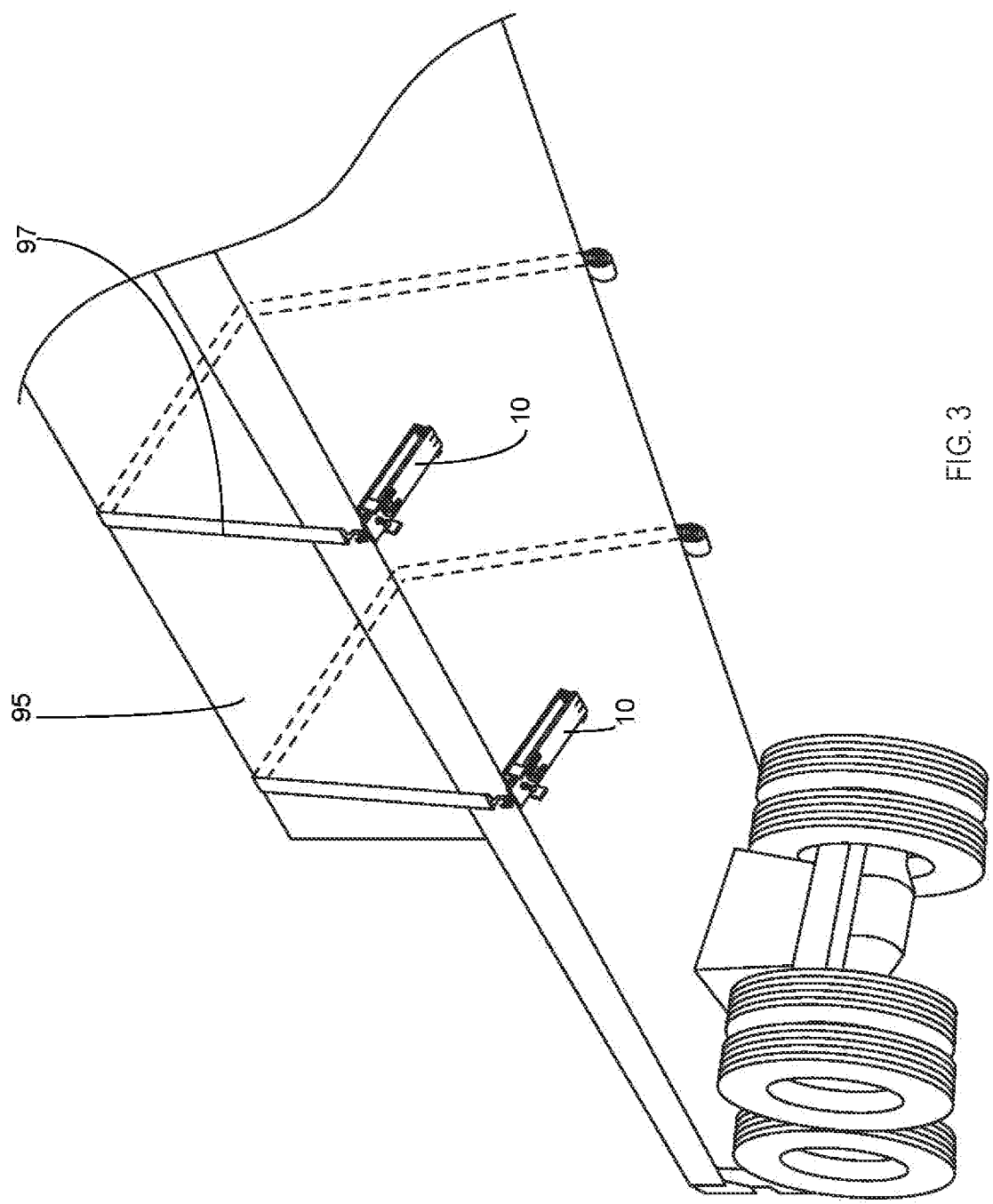
FIG. 3 is a bottom perspective view of the present invention installed on an exemplary flatbed trailer.

Referring now to the drawings submitted herewith, wherein various elements depicted therein are not necessarily drawn to scale and wherein through the views and figures like elements are referenced with identical reference numerals, there is illustrated a securing apparatus 100 constructed according to the principles of the present invention.

An embodiment of the present invention is discussed herein with reference to the figures submitted herewith. Those skilled in the art will understand that the detailed description herein with respect to these figures is for explanatory purposes and that it is contemplated within the scope of the present invention that alternative embodiments are plausible. By way of example but not by way of limitation, those having skill in the art in light of the present teachings of the present invention will recognize a plurality of alternate and suitable approaches dependent upon the needs of the particular application to implement the functionality of any given detail described herein, beyond that of the particular implementation choices in the embodiment described herein. Various modifications and embodiments are within the scope of the present invention.

It is to be further understood that the present invention is not limited to the particular methodology, materials, uses and applications described herein, as these may vary. Furthermore, it is also to be understood that the terminology used herein is used for the purpose of describing particular embodiments only, and is not intended to limit the scope of the present invention. It must be noted that as used herein and in the claims, the singular forms "a", "an" and "the" include the plural reference unless the context clearly dictates otherwise. Thus, for example, a reference to "an element" is a reference to one or more elements and includes equivalents thereof known to those skilled in the art. All conjunctions used are to be understood in the most inclusive sense possible. Thus, the word "or" should be understood as having the definition of a logical "or" rather than that of a logical "exclusive or" unless the context clearly necessitates otherwise. Structures described herein are to be understood also to refer to functional equivalents of such structures. Language that may be construed to express approximation should be so understood unless the context clearly dictates otherwise.

References to "one embodiment", "an embodiment", "exemplary embodiments", and the like may indicate that the embodiment(s) of the invention so described may include a particular feature, structure or characteristic, but not every embodiment necessarily includes the particular feature, structure or characteristic.

Now referring in particular to the Figures submitted herewith, the securing apparatus 100 includes a first plate member 10. The first plate member 10 includes a first end 11 and second end 12 and is planar in manner. The first plate member is rectangular in shape and is manufactured to a suitable thickness that provides sufficient strength to handle the force of operation of the securing apparatus 100. It is contemplated within the scope of the present invention that the first plate member 10 could be provided in alternate sizes and shapes to accommodate various load requirements and different trailer configurations. The first plate member 10 includes a bottom surface 13 to which the cylinder bracket member 20 is secured thereto.

The cylinder bracket member 20 is manufactured from metal and is secured to the bottom surface 13 of the first plate member 10 utilizing suitable techniques such as but not limited to welding. The cylinder bracket member 20 is u-shaped having an open end 21. The open end 21 provides the ability for a user of the securing apparatus 100 to slide the cylinder member 40 into the void 22 of the cylinder bracket member 20. An aperture 35 is bored through the first plate member 10 and the cylinder bracket member 20 is surroundably present thereto. The aperture 35 provides the necessary element for the piston 42 of the cylinder member 40 to pass therethrough and engage the bottom surface 98 of the trailer 99 as is further discussed herein.

The cylinder bracket member includes groove 28 formed therein wherein the groove 28 releasably secures the cylinder member 40 into the cylinder bracket member 20. The cylinder member 40 is slidably positioned into the cylinder bracket member 20 wherein the user will position the top of the cylinder adjacent open end 21 and slide the cylinder member 40 into the void 22 so as to axially align the piston 42 with the aperture 35. The groove 28 is formed to mateably couple to the cylinder member 40 in order to releasably secure the cylinder member 40 and inhibit any upwards-downwards movement thereof during operation of the securing apparatus 100. While the cylinder bracket member 20 is illustrated herein as being u-shaped, it should be understood within the scope of the present invention that the cylinder bracket member 20 could be formed in alternate shapes and employ alternate elements and achieve the desired objective discussed herein.

The cylinder member 40 is a conventional hydraulic cylinder coupled to a drive member (not illustrated herein) via hose 47. The piston 42 of the cylinder is operable to be moved in an upwards-downwards direction. While a hydraulic cylinder is preferred, it is contemplated within the scope of the present invention that alternate devices could be utilized to execute the functionality of the cylinder member 40 as described herein. The piston 42 is moved in an upwards direction through the aperture 35 to engage the bottom 98 of the trailer 99. As the piston 42 moves upwards, the first plate member 10 is moved in a downwards direction. A strap 97 secured to the hook member 60 will begin to tighten over object 95. The user of the securing apparatus 100 will continue to utilize the cylinder member 40 to move the first plate member 10 in a downwards direction until the strap 97 is tightened sufficiently to ensure securing of the object 95. While not illustrated herein, it is contemplated within the scope of the present invention that the securing apparatus 100 could include a gauge operably coupled thereto configured to provide the pressure on the strap 97 so as to indicate sufficient tensioning of the strap 97. The hook member 60 is secured to the first plate member 10 utilizing suitable techniques and extends outward from the first end 11 so as to facilitate coupling with an end of the strap 97. It should be understood within the scope of the present invention that the hook member 60 could be constructed in numerous alternate manners in order to achieve the desired objective discussed herein.

Ensuing tightening of the strap 97 to a desired tension, the bolt member 70 and fasteners 72,73 are positioned prior to removal of the cylinder member 40 so as to secure the first plate member 10 in the positioned to which the first plate member 10 was moved to achieve the desired tension on the strap 97. Bolt member 70 includes an end that is secured into the bottom 98 of the trailer 99 and extends downward therefrom. Bolt member 70 includes external threads that facilitate movement of the fasteners 72,73 and allow the positioning thereof adjacent to the bottom surface 13 and the top surface 7 of the first plate member 10. Lateral bracket members 80,81 are secured to the bottom 98 of the trailer 99 and extend downward therefrom. The positioning of the lateral bracket member 80,81 inhibit any lateral movement of the first plate member 10 during operation of the securing apparatus 100. It should be understood within the scope of the present invention that the lateral bracket members 80,81 could be provided in alternate sizes.

The first plate member 10 is movably secured to the trailer 99 proximate the second end 12 utilizing connection assembly 65. It is contemplated within the scope of the present invention that the second end 12 could be either pivotally coupled to the trailer 99 with the connection assembly 65 or configured to move in conjunction with the first end 11 maintaining the first plate member 10 in a parallel position with the trailer 99 during the movement thereof. It is contemplated within the scope of the present invention that the connection assembly 65 could be constructed in numerous manners in order to achieve the desired objective discussed herein. The connection assembly 65 is further configured so as to inhibit rattling and movement of the second end 12.

In the preceding detailed description, reference has been made to the accompanying drawings that form a part hereof, and in which are shown by way of illustration specific embodiments in which the invention may be practiced. These embodiments, and certain variants thereof, have been described in sufficient detail to enable those skilled in the art to practice the invention. It is to be understood that other suitable embodiments may be utilized and that logical changes may be made without departing from the spirit or scope of the invention. The description may omit certain information known to those skilled in the art. The preceding description is, therefore, not intended to be limited to the specific forms set forth herein, but on the contrary, it is intended to cover such alternatives, modifications, and equivalents, as can be reasonably included within the spirit and scope of the invention.

What is claimed is:

1. A cargo securing apparatus that is configured to provide operation of a strap superposed an item on a flatbed trailer wherein the cargo securing apparatus comprises:
    a first plate member, said first plate member having a first end and a second end, said first plate member having an upper surface and a lower surface, said first plate member being movably mounted adjacent a bottom of the flatbed trailer;
    an aperture, said aperture being bored through said first plate member proximate said first end of said first plate member;
    a movement member bracket, said movement member bracket being secured to said lower surface of said first plate member, said movement member bracket being proximate said aperture;
    a movement member, said movement member being releasably secured to said movement member bracket, said movement member having a portion thereof operably to move in an upwards-downwards direction, wherein the portion is configured to pass through said aperture; and
    wherein the portion of the movement member engages the bottom of the flatbed trailer so as to move the first plate member away from the flatbed trailer and provide tensioning of the strap secured thereto.

2. The cargo securing apparatus configured to provide operation of the strap as recited in claim 1, and further including a hook member, said hook member being secured to said first plate member and extending outward therefrom, said hook member configured to have an end of the strap coupled thereto.

3. The cargo securing apparatus configured to provide operation of the strap as recited in claim 2, and further including a securing member, said securing member having an end attached to the bottom of the flatbed trailer, said securing member extending downward from the bottom of the flatbed trailer, said securing member configured to maintain a position of the first plate member.

4. The cargo securing apparatus configured to provide operation of the strap as recited in claim 3, and further including a connection assembly, said connection assembly configured to movably couple the second end of the first plate member to the bottom of the flatbed trailer.

5. The cargo securing apparatus configured to provide operation of the strap as recited in claim 4, and further including lateral bracket members, said lateral bracket member being secured to the bottom of the flatbed trailer and extending downward therefrom, said lateral bracket members being located on opposing sides of the first plate member so as to inhibit lateral movement thereof.

6. The cargo securing apparatus configured to provide operation of the strap as recited in claim 5, wherein said movement member is a hydraulic cylinder.

7. A cargo securing apparatus mounted to a flatbed trailer and operable to provide tension and loosening of a strap operably coupled therewith wherein the cargo securing apparatus comprises:
    a first plate member, said first plate member having a first end and a second end, said first plate member having an upper surface and a lower surface, said first plate member being movably mounted adjacent a bottom of the flatbed trailer, said first plate member being rectangular in shape;
    an aperture, said aperture being bored through said first plate member proximate said first end of said first plate member;
    a cylinder bracket member, said cylinder bracket member being secured to said lower surface of said first plate member, said cylinder bracket member being formed so as to partially surround said aperture, said cylinder bracket member having an opening providing access to a void;
    a cylinder member, said cylinder member being releasably secured to said cylinder bracket member, said cylinder member having piston operable to move in an upwards-downwards direction, wherein the piston is configured to pass through said aperture; and
    wherein the piston of the cylinder member engages the bottom of the flatbed trailer so as to move the first plate member away from the flatbed trailer and provide tensioning of the strap secured thereto.

8. The cargo securing apparatus mounted to the flatbed trailer and operable to provide tension and loosening of the strap as recited in claim 7, wherein said cylinder bracket member further includes a groove formed on an inner wall surface thereof, said groove configured to releasably secure the cylinder member in the void of the cylinder bracket member.

9. The cargo securing apparatus mounted to the flatbed trailer and operable to provide tension and loosening of the strap as recited in claim 8, and further including a hook member, said hook member being secured to said first plate member and extending outward therefrom, said hook member configured to have an end of the strap coupled thereto.

10. The cargo securing apparatus mounted to the flatbed trailer and operable to provide tension and loosening of the strap as recited in claim 9, and further including a bolt member, said bolt member having an end secured to the bottom of the flatbed trailer, said bolt member extending downward from the bottom of the flatbed trailer and having a second end operably coupled to the first plate member, said bolt member having a first fastener and a second fastener coupled thereto, said bolt member operable to maintain said first plate member in a desired position.

11. The cargo securing apparatus mounted to the flatbed trailer and operable to provide tension and loosening of the strap as recited in claim 10, and further including a connection assembly, said connection assembly configured to movably couple the second end of the first plate member to the bottom of the flatbed trailer.

12. The cargo securing apparatus mounted to the flatbed trailer and operable to provide tension and loosening of the strap as recited in claim 11, wherein said cylinder bracket member is u-shaped.

13. The cargo securing apparatus mounted to the flatbed trailer and operable to provide tension and loosening of the strap as recited in claim 12, and further including lateral bracket members, said lateral bracket member being secured to the bottom of the flatbed trailer and extending downward therefrom, said lateral bracket members being located on opposing sides of the first plate member so as to inhibit lateral movement thereof.

14. The cargo securing apparatus mounted to the flatbed trailer and operable to provide tension and loosening of the strap as recited in claim 13, wherein said cylinder member is a hydraulic cylinder.

\* \* \* \* \*